(12) United States Patent
Mochizuki

(10) Patent No.: US 7,133,464 B2
(45) Date of Patent: Nov. 7, 2006

(54) TRANSMISSION APPARATUS

(75) Inventor: Takashi Mochizuki, Tokyo (JP)

(73) Assignee: NEC Corporation (JP)

( * ) Notice: Subject to any disclaimer, the term of this patent is extended or adjusted under 35 U.S.C. 154(b) by 849 days.

(21) Appl. No.: 09/769,688

(22) Filed: Jan. 25, 2001

(65) Prior Publication Data
US 2001/0009572 A1 Jul. 26, 2001

(30) Foreign Application Priority Data
Jan. 25, 2000 (JP) .............................. 2000-015455

(51) Int. Cl.
H04L 25/49 (2006.01)
(52) U.S. Cl. .................................... 375/296
(58) Field of Classification Search ................ 375/262, 375/296, 261, 260, 259, 295; 455/213, 339, 455/212, 205, 130, 338, 334; 327/552, 551, 327/524; 342/101, 99, 98, 89, 73
See application file for complete search history.

(56) References Cited
U.S. PATENT DOCUMENTS 5,752,171 A * 5/1998 Akiya ........................ 455/126
6,178,162 B1 * 1/2001 Dal Farra et al. ............ 370/286
6,262,637 B1 * 7/2001 Bradley et al. .............. 333/133
6,275,103 B1 * 8/2001 Maniwa ...................... 330/149
6,356,746 B1 * 3/2002 Katayama ................... 455/324
6,865,216 B1 * 3/2005 Beamish et al. ............. 375/140

FOREIGN PATENT DOCUMENTS

JP 6-152553 5/1994

OTHER PUBLICATIONS

Japanese Office Action issued Sep. 3, 2002 (w/ English translation of relevant portion).

* cited by examiner

Primary Examiner—Pankaj Kumar
(74) Attorney, Agent, or Firm—Dickstein, Shapiro, LLP.

(57) ABSTRACT

A transmission apparatus includes a filter, multiplier, and controller. The filter reduces leakage power outside the transmission signal band. In the filter, a first attenuation amount more than a predetermined amount or a second attenuation amount not more than the predetermined amount is selectively set in a range higher than the transmission signal band. The multiplier modulates the transmission signal output from the filter. The controller sets one of the first and second attenuation amounts in the filter in accordance with the use situation of a band adjacent to the transmission signal band.

9 Claims, 5 Drawing Sheets

TRANSMISSION APPARATUS

BACKGROUND OF THE INVENTION

The present invention relates to a transmission apparatus in a mobile communication system and, more particularly, to a transmission apparatus in a mobile communication system using the CDMA (Code Division Multiple Access) scheme.

As shown in FIG. 9, a transmission apparatus in a conventional cellular mobile communication system comprises pulse shaping filters 201 and 202 for receiving transmission signals S'1 and S'2, respectively, multipliers 203 and 204 for multiplying the outputs from the pulse shaping filters 201 and 202 by carrier waves, an adder 205 for adding the outputs from the multipliers 203 and 204, a transmission amplifier 206 for amplifying the output from the adder 205, a circulator 207 for receiving the output from the transmission amplifier 206, and an antenna 208 for radiating the output from the circulator 207 as a radio wave.

In this arrangement, the transmission signals S'1 and S'2 are limited in their bands by the pulse shaping filters 201 and 202 and multiplied by carrier waves by the multipliers 203 and 204, respectively. The output signals from the multipliers 203 and 204 are added by the adder 205 and then sent from the antenna 208 through the transmission amplifier 206 and circulator 207.

Generally, the transmission power of a mobile communication system is designed to be small outside the band, as shown in FIG. 10. In the above-described conventional transmission apparatus, however, since the power is amplified by the transmission amplifier 206 after bands are limited by the pulse shaping filters 201 and 202, sufficient attenuation is required in bands B1 and B2 outside a band B0 in use. To obtain sufficient attenuation outside the band, the pulse shaping filters 201 and 202 must have steep characteristics or the transmission amplifier 206 must have high linearity.

However, steeper the characteristics on a pulse shaping filter and higher the linearity on a transmission amplifier are required, more the power consumption and the cost are necessary.

SUMMARY OF THE INVENTION

It is an object of the present invention to provide a transmission apparatus capable of decreasing power consumption and reducing leakage power outside the transmission band with a simple arrangement.

In order to achieve the above object, according to the present invention, there is provided a transmission apparatus comprising filter means for reducing leakage power outside a transmission signal band, the filter means having a first attenuation amount more than a predetermined amount or a second attenuation amount not more than the predetermined amount selectively set in a range higher than a transmission signal band, modulation means for modulating the transmission signal output from the filter means, and control means for setting one of the first and second attenuation amounts in the filter means in accordance with a use situation of a band adjacent to the transmission signal band.

DESCRIPTION OF THE PREFERRED EMBODIMENT

The present invention will be described below in detail with reference to the accompanying drawings.

Figure 1:
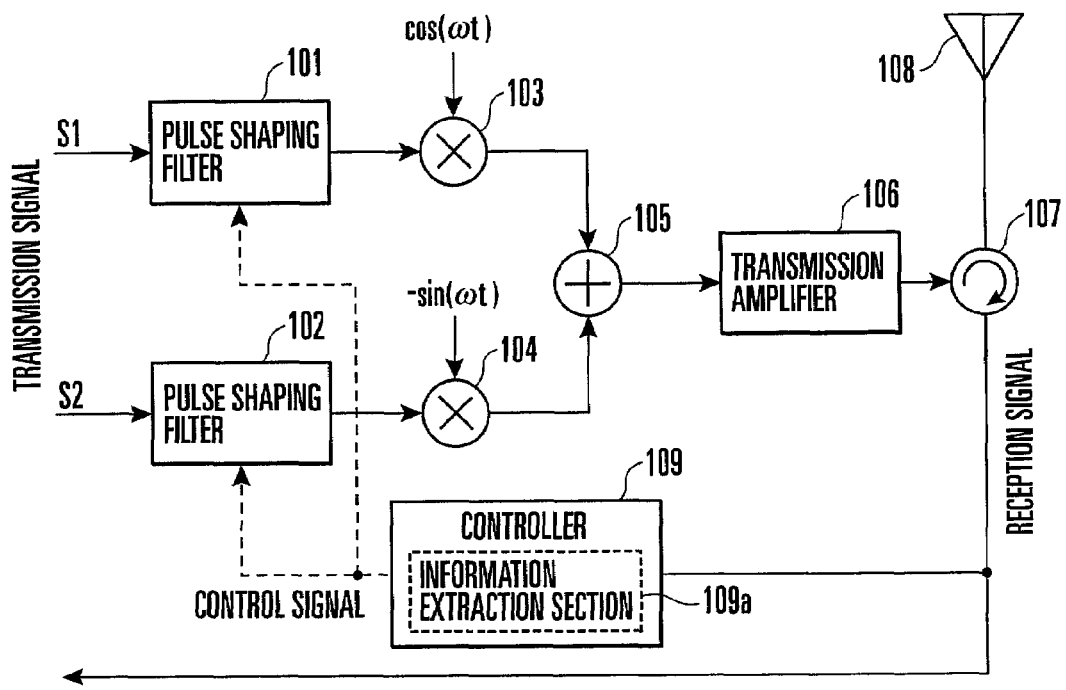
FIG. 1 is a block diagram showing the arrangement of a transmission apparatus according to an embodiment of the present invention.

FIG. 1 shows the arrangement of a transmission apparatus according to an embodiment of the present invention. The transmission apparatus of this embodiment is arranged in a mobile station of a communication system using the CDMA scheme.

As shown in FIG. 1, the transmission apparatus according to this embodiment comprises pulse shaping filters 101 and 102 for reducing leakage power outside the transmission band from the transmission signals S1 and S2, multipliers 103 and 104 serving as modulation means for modulating carrier waves by the outputs from the pulse shaping filters 101 and 102, respectively, an adder 105 for adding the outputs from the multipliers 103 and 104, a transmission amplifier 106 for amplifying the output from the adder 105, a circulator 107 for receiving the output from the transmission amplifier 106, an antenna 108 for radiating the output from the circulator 107 as a radio wave, and a controller 109 for selecting one of the pulse shaping filters 101 and 102 on the basis of a reception signal output from the circulator 107. The controller 109 has an information extraction section 109a for extracting necessary information from a reception signal through the antenna 108 and circulator 107.

Figure 2:
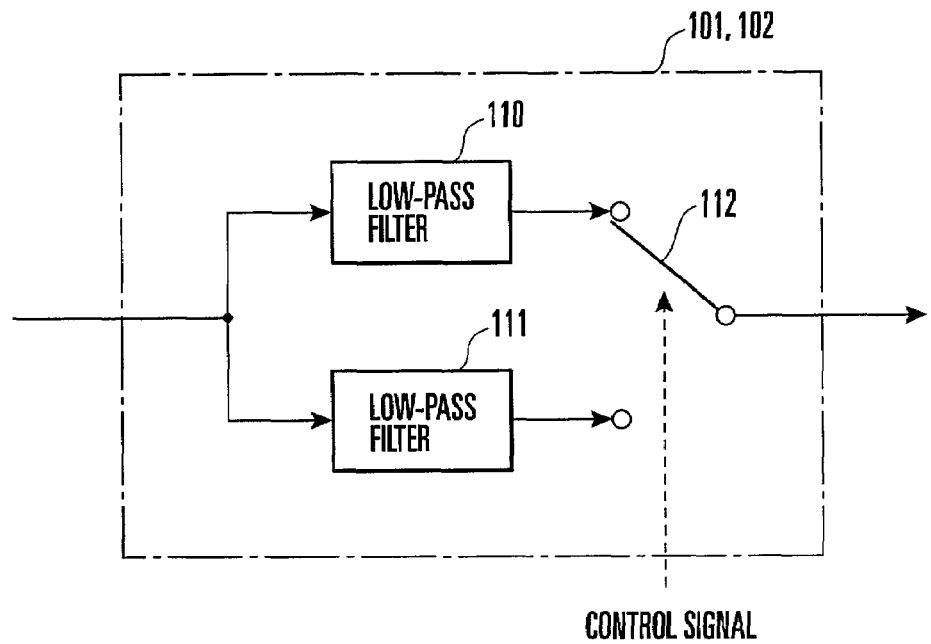
FIG. 2 is a block diagram showing the internal arrangement of a pulse shaping filter shown in FIG. 1.
Figure 3:
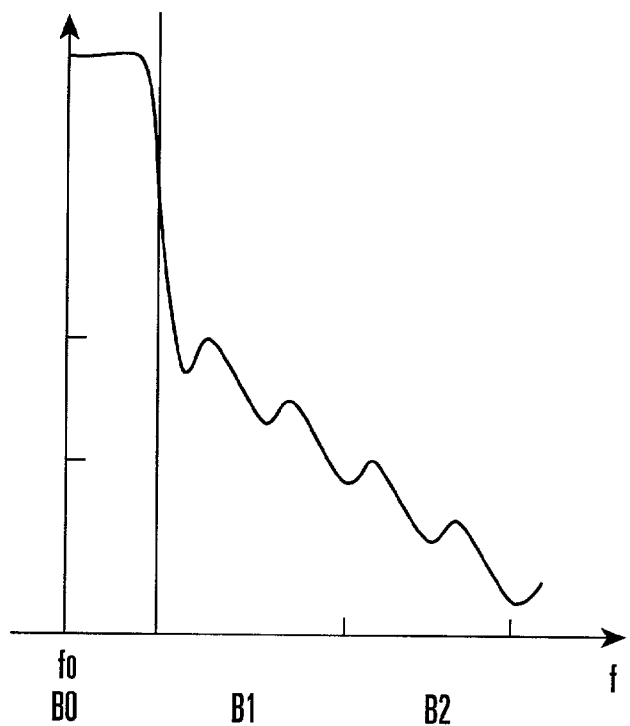
FIG. 3 is a graph showing the frequency characteristic of a low-pass filter having a small attenuation amount in FIG. 2.
Figure 4:
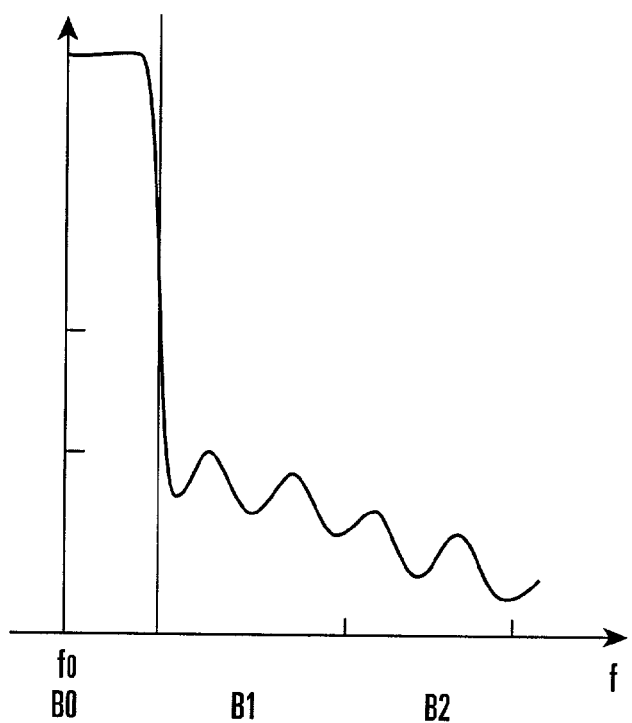
FIG. 4 is a graph showing the frequency characteristic of a low-pass filter having a large attenuation amount in FIG. 2.

As shown in FIG. 2, each of the pulse shaping filters 101 and 102 comprises low-pass filters 110 and 111 for commonly receiving a signal, and a switch 112 for selectively outputting one of the outputs from the low-pass filters 110 and 111. The frequency characteristic of the low-pass filter 110 is designed such that the attenuation amount in the range higher than the use band has a predetermined or smaller value, as shown in FIG. 3. The frequency characteristic of the low-pass filter 111 is designed such that the attenuation amount in the range higher than the use band has a value larger than the predetermined value, as shown in FIG. 4.

In this arrangement, the low-pass filter 110 or 111 is selected by the controller 109 depending on whether an adjacent frequency band is used (assigned) in an adjacent system. More specifically, when the adjacent system uses the adjacent frequency band, the low-pass filter 111 is selected by a control signal output from the controller 109. When no adjacent frequency band is used in the adjacent system, the low-pass filter 110 is selected by a control signal output from the controller 109. At this time, power supply to the unselected filter is simultaneously stopped.

The operation of the transmission apparatus having the above arrangement will be described next.

The transmission signals S1 and S2 are limited in their bands by the pulse shaping filters 101 and 102 first. At this time, the information extraction section 109a of the controller 109 extracts, from a reception signal, use information that is transmitted from the base station (not shown) and indicates the use situation of an adjacent frequency band. The controller 109 outputs a control signal to the pulse shaping filters 101 and 102 on the basis of the received use information. In each of the pulse shaping filters 101 and 102, the switch 112 is switched in accordance with the control signal from the controller 109 to select one of the low-pass filters 110 and 111. In this case, the selected one of the low-pass filters 110 and 111 executes filter processing for the transmission signal.

The signals S1 and S2 whose bands are limited by the pulse shaping filters 101 and 102 are multiplied by carrier waves $\cos(\omega t)$ and $-\sin(\omega t)$ by the multipliers 103 and 104, respectively, and added by the adder 105. The output from the adder 105 is amplified by the transmission amplifier 106 and transmitted from the antenna 108 through the circulator 107.

The transmission amplifier 106, circulator 107, and antenna 108 are devices for transmitting/receiving a signal through a radio channel. They are known by those who are skilled in the art well and are irrelevant to the present invention, so a detailed description of the arrangement and operation will be omitted.

Figure 5:
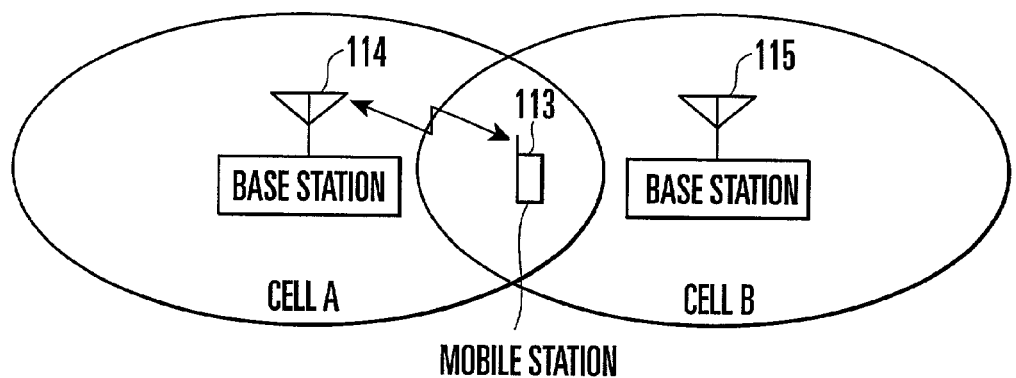
FIG. 5 is a view for explaining a state wherein adjacent cells use adjacent frequency bands.

Assume that a mobile station 113 which is communicating in a cell A is located near a base station 115 in a cell B adjacent to the cell A, as shown in FIG. 5. The cells A and B form different mobile communication systems. In this case, when the adjacent cell B uses an adjacent frequency band, the mobile station 113 can reduce the influence on the system of the adjacent cell B by selecting a filter having a large attenuation amount for transmission. On the other hand, when no adjacent frequency band is used in the adjacent cell B, power consumption can be reduced by lowering the attenuation amount to a predetermined value.

Figure 6:
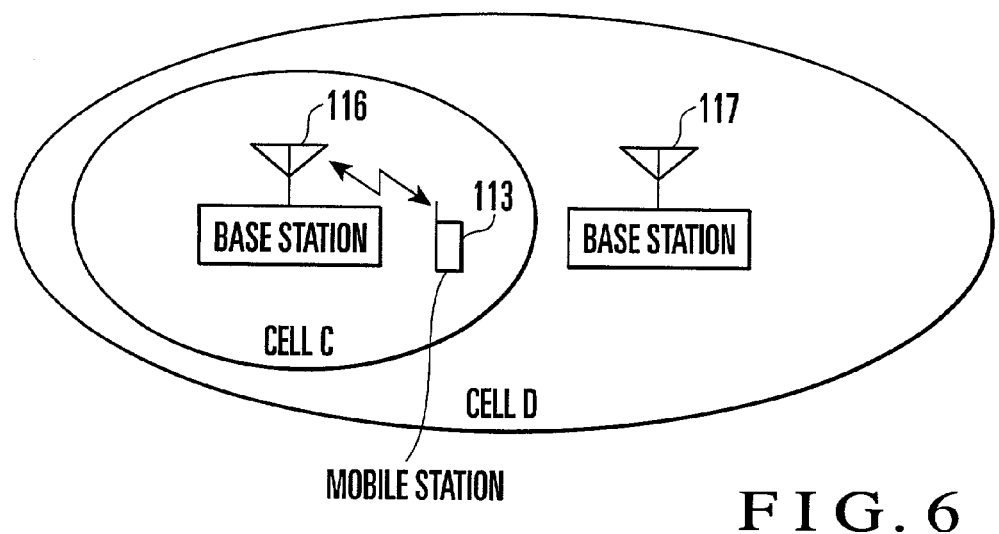
FIG. 6 is a view for explaining a state wherein a large cell and a small cell contained in the large cell use adjacent frequency bands.

Next, assume that a small cell C is present in a large cell D, and that the mobile station 113 is communicating in the cell C, as shown in FIG. 6. In this case, when an adjacent frequency band is used in the superposing cell D, the mobile station 113 can reduce the influence on the system of the superposing cell D by selecting a filter having a large attenuation amount for transmission. On the other hand, when no adjacent frequency band is used in the superposing cell D, power consumption can be reduced by lowering the attenuation amount to a predetermined value.

Figure 7:
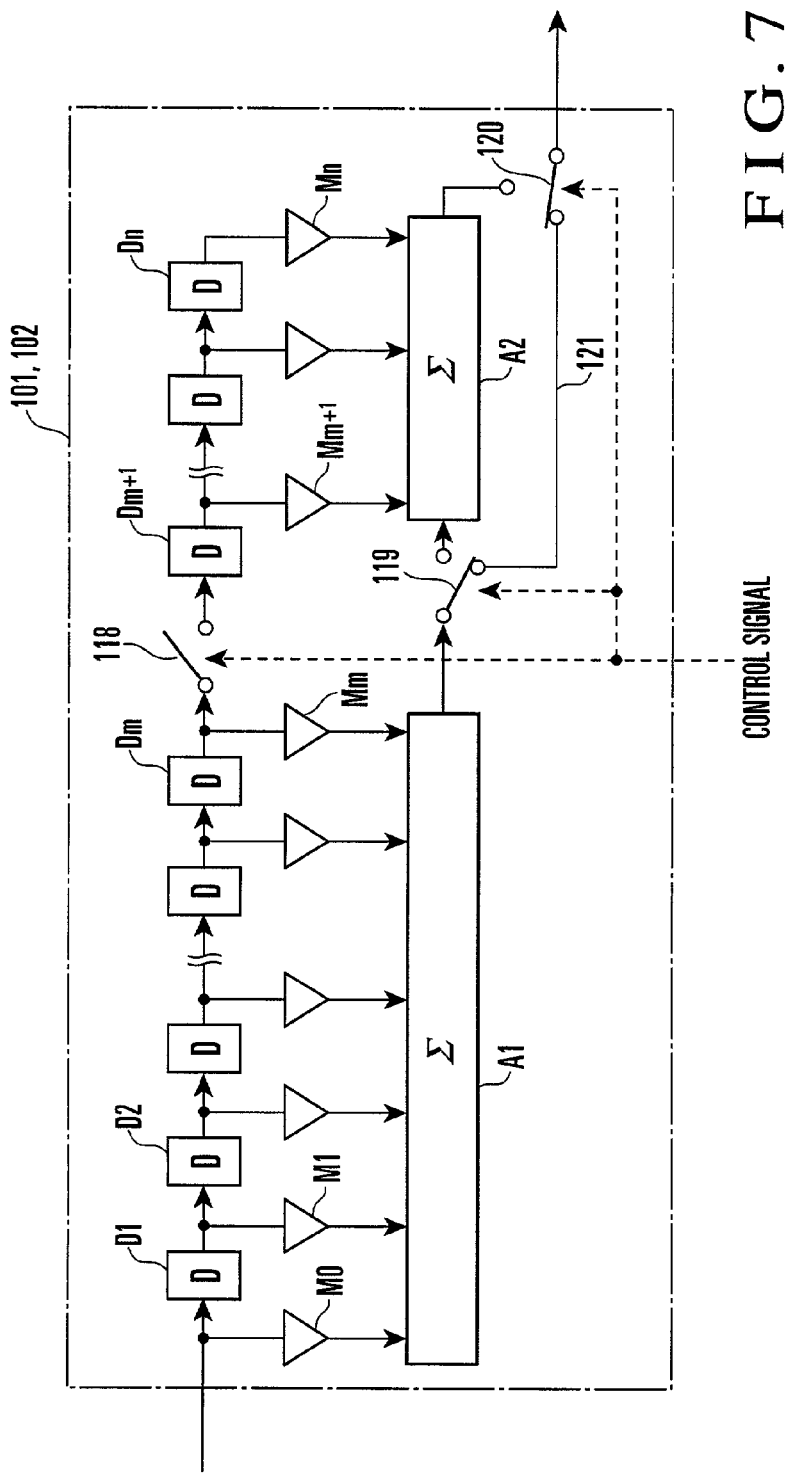
FIG. 7 is a block diagram showing another example of the pulse shaping filters 101 and 102 shown in FIG. 1.

FIG. 7 shows another example of the pulse shaping filters 101 and 102. In this example, a filter having a small attenuation amount is implemented by part of a filter having a large attenuation amount. Referring to FIG. 7, the pulse shaping filter 101 or 102 is formed from an FIR (Finite Impulse Response) filter having a plurality of delay elements $D_1$ to $D_n$ (n is a positive integer: $n \geq 2$) cascade-connected, a plurality of digital multipliers $M_0$ to $M_n$ for weighting the outputs from the delay elements $D_1$ to $D_n$, respectively, and accumulators A1 and A2 for dividing and cumulatively adding the outputs from the digital multipliers $M_0$ to $M_n$. The pulse shaping filter 101 or 102 also has changeover switches 118, 119, and 120 ON/OFF-controlled by a control signal from the controller 109. The changeover switch 118 may be omitted.

In this case, the delay elements $D_1$ to $D_n$, digital multipliers $M_0$ to $M_n$, and accumulator A1 correspond to the low-pass filter 110 shown in FIG. 2. The delay elements $D_1$ to $D_n$, the plurality of digital multipliers $M_0$ to $M_n$, and accumulators A1 and A2 correspond to the low-pass filter 111 shown in FIG. 2. The changeover switches 118, 119, and 120 correspond to the switch 112 shown in FIG. 2.

In this arrangement, when the changeover switch 118 is turned off, and the accumulator A2 is bypassed through a bypass path 121 by the changeover switches 119 and 120, as shown in FIG. 7, a filter having a low attenuation amount can be formed from the delay elements $D_1$ to $D_m$. When the changeover switch 118 is turned on, and the accumulator A2 is cascade-connected to the accumulator A1 by the changeover switches 119 and 120, a filter having a large attenuation amount can be formed from the delay elements $D_1$ to $D_n$. The number of delay elements $D_1$ to $D_m$ or delay elements $D_1$ to $D_n$, which determines the attenuation amount, is determined to an optimum number for the system.

According to this example, since neither pulse shaping filter with steep characteristics nor transmission amplifier with high linearity is required, and only one FIR filter suffices, the cost can be reduced.

Figure 8:
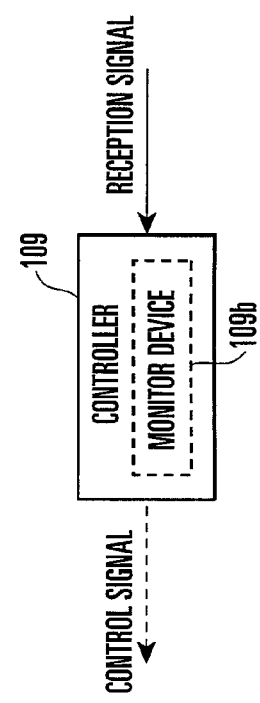
FIG. 8 is a view showing an example of a controller having a monitor device.
Figure 9:
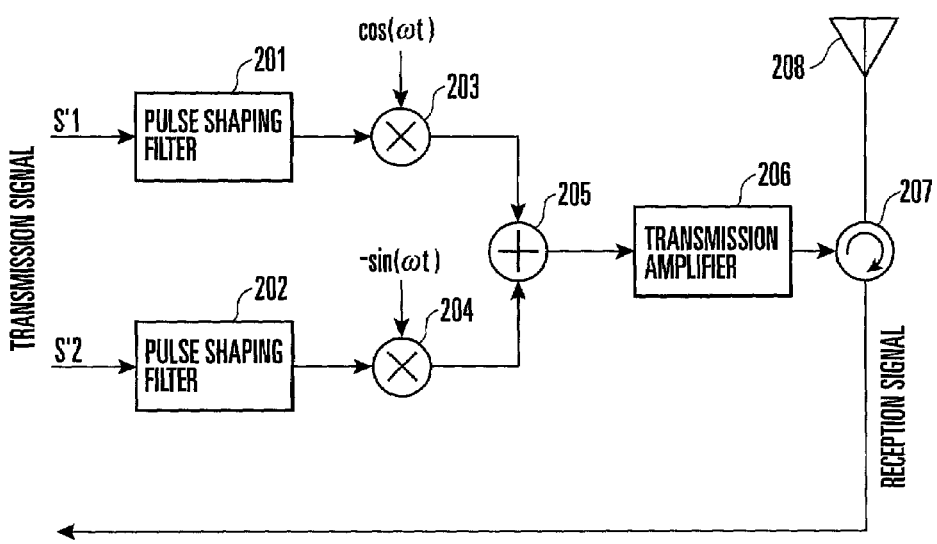
FIG. 9 is a block diagram showing the arrangement of a conventional transmission apparatus.
Figure 10:
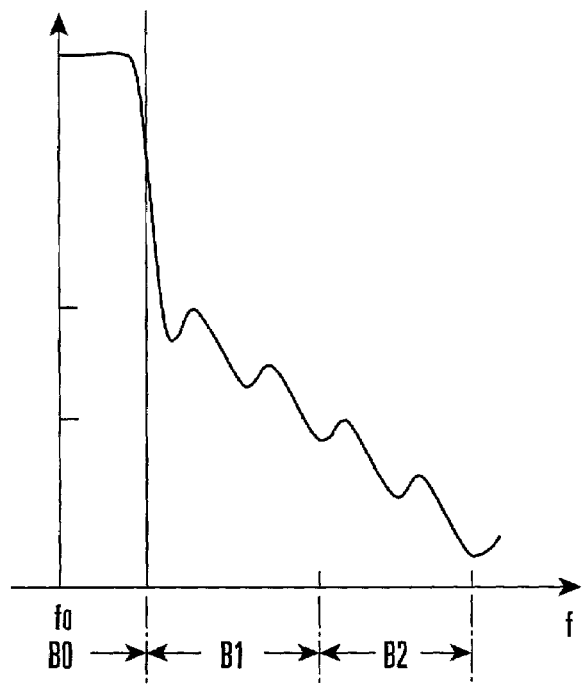
FIG. 10 is a graph showing the frequency characteristic of a pulse shaping filter shown in FIG. 9.

A case wherein the base station transmits no use information representing the use situation of an adjacent frequency band will be described next. In this case, as show in FIG. 8, the controller 109 has a monitor device 109b for monitoring a reception signal. The controller 109 determines the use situation of an adjacent frequency band in accordance with the monitor result from the monitor device 109b and outputs a control signal. The processing of determining the use situation of an adjacent frequency band, including the monitor operation, is processing of determining on the basis of a reception signal whether an adjacent frequency band is being used in an adjacent system. This processing is known by a person skilled in the art in the communication system using the CDMA scheme.

In the above embodiment, the transmission apparatus is arranged in a mobile station. However, the present invention is not limited to this. For example, when the transmission apparatus is applied to a base station, the use frequency band of an adjacent system is fixed and known. For this reason, one of the low-pass filters 110 and 111 is prepared in each base station in accordance with whether the adjacent frequency band is used in the adjacent system. In this case, the controller 109 and switch 112 are unnecessary.

The present invention is not limited to the above-described embodiment, and various changes and modifications can be appropriately made without departing from the spirit and scope of the present invention.

What is claimed is:

1. A transmission apparatus comprising:
  adjustable filter means for reducing leakage power outside a transmission signal band, said filter means having a first attenuation amount more than a predetermined amount and a second attenuation amount not more than the predetermined amount selectively set in a range higher than a transmission signal band;
  modulation means for modulating the transmission signal output from said filter means;
  control means for selecting, during operation, between the first and second attenuation amounts in said adjustable filter means in accordance with a use situation of a band adjacent to the transmission signal band and said adjustable filter means comprises a first low-pass filter having the first attenuation amount, and a second low-pass filter having the second attenuation amount, and said control means selects one of said first and second low-pass filters in accordance with the use situation of the band adjacent to the transmission signal band.

2. A transmission apparatus comprising:

adjustable filter means for reducing leakage power outside a transmission signal band, said filter means having a first attenuation amount more than a predetermined amount or a second attenuation amount not more than the predetermined amount selectively set in a range higher than a transmission signal band;

modulation means for modulating the transmission signal output from said filter means; and control means for the first and second attenuation amounts in said adjustable filter means in accordance with a use situation of a band adjacent to the transmission signal band;

wherein said adjustable filter means comprises a first low-pass filter having the first attenuation amount, and a second low-pass filter having the second attenuation amount, and said control means selects one of said first and second low-pass filters in accordance with the use situation of the band adjacent to the transmission signal band;

wherein said first low-pass filter comprises a first delay element group formed from a plurality of delay elements cascade-connected, a second delay element group formed from a plurality of delay elements cascade-connected to receive an output from said first delay element group, a first accumulator for cumulatively adding weighted outputs from the delay elements of said first delay element group, and a second accumulator for cumulatively adding weighted outputs from the delay elements of said second delay element group, and said second low-pass filter comprises said first delay element group, and said first accumulator.

3. An apparatus according to claim 2, further comprising a bypass path for bypassing said second accumulator, a first changeover switch for selectively connecting an output terminal of said accumulator to one of an input terminal of said second accumulator and one terminal of said bypass path, and a second changeover switch for selectively connecting an output terminal of said filter to an output terminal of said second accumulator and the other terminal of said bypass path.

4. An apparatus according to claim 1, wherein said apparatus further comprises switch means for selecting one of said first and second low-pass filters, and said control means controls said switch means to extract one of outputs from said first and second low-pass filters as a transmission signal.

5. An apparatus according to claim 1, wherein when said first low-pass filter is selected, power supply to said second low-pass filter is stopped, and when said second low-pass filter is selected, power supply to said first low-pass filter is stopped.

6. An apparatus according to claim 1, wherein said filter means, modulation means, and control means are arranged in one of a mobile station and a base station of a mobile communication system.

7. An apparatus according to claim 6, wherein said apparatus further comprises extraction means for extracting information related to the use situation of the band adjacent to the transmission signal band from a reception signal, and said control means performs operation of setting the first and second attenuation amounts on the basis of an output from said extraction means.

8. An apparatus according to claim 6, wherein said apparatus further comprises monitor means for monitoring the use situation of the band adjacent to the transmission signal band from a reception signal, and said control means performs operation of setting the first and second attenuation amounts on the basis of an output from said monitor means.

9. An apparatus according to claim 6, wherein when the band adjacent to the transmission signal band is used in an adjacent/superposing system, said control means sets the first attenuation amount in said filter means, and when the band adjacent to the transmission signal band is not used in the adjacent/superposing system, said control means sets the second attenuation amount in said filter means.

* * * * *